United States Patent
Prince et al.

(10) Patent No.: US 9,263,869 B2
(45) Date of Patent: Feb. 16, 2016

(54) CART WITH CABLE MANAGEMENT SYSTEM

(71) Applicant: Ergotron, Inc., Eagan, MN (US)

(72) Inventors: David J. Prince, St. Paul, MN (US); Robert W. Fluhrer, Prior Lake, MN (US); Scott Trish, Lakeville, MN (US); William D. Tischer, St. Paul, MN (US); Saeb Asamarai, Columbia Heights, MN (US); Ryan Dahl, Inver Grove Heights, MN (US)

(73) Assignee: Ergotron, Inc., St. Paul, MN (US)

( * ) Notice: Subject to any disclaimer, the term of this patent is extended or adjusted under 35 U.S.C. 154(b) by 201 days.

(21) Appl. No.: 13/956,812

(22) Filed: Aug. 1, 2013

(65) Prior Publication Data

US 2014/0036419 A1 Feb. 6, 2014

Related U.S. Application Data

(60) Provisional application No. 61/678,302, filed on Aug. 1, 2012.

(51) Int. Cl.
*H02G 3/18* (2006.01)
*H02B 1/52* (2006.01)
*G06F 1/16* (2006.01)
*H02J 7/00* (2006.01)

(52) U.S. Cl.
CPC ............... *H02G 3/18* (2013.01); *G06F 1/1632* (2013.01); *H02B 1/52* (2013.01); *H02J 7/0027* (2013.01)

(58) Field of Classification Search
CPC ............. H02G 3/18; H02B 1/52; H02B 3/00; H02B 1/00; A47B 83/00; G06F 1/16; G06F 1/1632; H05K 5/00
USPC ................ 361/601, 606, 616, 622, 641, 657, 361/679.01, 724–731, 756, 825, 829, 832; 307/107, 111, 43, 80, 85; 318/280, 318/139; 320/105, 107, 111, 114, 116, 119, 320/134; 280/35, 47, 47.34, 79.11, 79.2, 280/47.26, 37, 47.29, 79.3; 312/223.2, 312/223.3, 236, 223.6, 114, 244; 347/10, 347/11, 57, 85
See application file for complete search history.

(56) References Cited

U.S. PATENT DOCUMENTS 6,008,621 A * 12/1999 Madison et al. ............... 320/107
6,218,796 B1 * 4/2001 Kozlowski ..................... 318/280
6,805,579 B2 * 10/2004 Marchand et al. ............. 439/502
6,951,468 B1 * 10/2005 Greco ............................ 439/131

(Continued)

FOREIGN PATENT DOCUMENTS

WO    WO-2014/022684 A2    2/2014

OTHER PUBLICATIONS

"International Application Serial No. PCT/US2013/053256, International Preliminary Report on Patentability mailed Feb. 12, 2015", 12 pgs.

(Continued)

*Primary Examiner* — Michail V Datskovskiy
(74) *Attorney, Agent, or Firm* — Schwegman Lundberg & Woessner, P.A.

(57) ABSTRACT

A cart with one or more of a power supply system that includes an outlet box and a plurality of flexible receptacles, a bi-layer shelf, a positionable cable routing tray, and a removable cable management module.

14 Claims, 23 Drawing Sheets

(56) References Cited

U.S. PATENT DOCUMENTS

| | | | |
|---|---|---|---|
| 7,055,833 B2 * | 6/2006 | Wixted et al. | 280/47.34 |
| 7,130,190 B1 * | 10/2006 | Baker | 361/695 |
| 7,160,113 B2 * | 1/2007 | McConnell et al. | 434/365 |
| 7,325,891 B1 * | 2/2008 | Kinsley et al. | 312/257.1 |
| 7,595,995 B2 * | 9/2009 | Hock | 361/727 |
| 7,800,914 B2 * | 9/2010 | Dully | 361/756 |
| 8,066,242 B2 * | 11/2011 | Potter et al. | 248/300 |
| 8,190,806 B2 * | 5/2012 | Petrick et al. | 710/303 |
| 8,243,455 B1 * | 8/2012 | Raymond et al. | 361/727 |
| 8,320,110 B2 * | 11/2012 | Chen | 361/679.02 |
| 8,582,299 B1 * | 11/2013 | Phillips et al. | 361/724 |
| 8,657,312 B2 * | 2/2014 | Guasta et al. | 280/79.2 |
| 8,752,848 B2 * | 6/2014 | Petrick et al. | 280/47.35 |
| 8,870,195 B2 * | 10/2014 | Guasta et al. | 280/79.2 |
| 8,916,991 B2 * | 12/2014 | Petrick et al. | 307/31 |
| 8,934,254 B2 * | 1/2015 | Petrick et al. | 361/727 |
| 2003/0028588 A1 | 2/2003 | McConnell | |
| 2003/0111245 A1 * | 6/2003 | Haggerty | 174/50 |
| 2003/0141687 A1 * | 7/2003 | Wixted et al. | 280/47.35 |
| 2004/0256135 A1 * | 12/2004 | Liu | 174/71 R |
| 2007/0058344 A1 * | 3/2007 | Baker | 361/695 |
| 2009/0016008 A1 * | 1/2009 | Hock | 361/683 |
| 2009/0096336 A1 * | 4/2009 | Petrick et al. | 312/237 |
| 2010/0090851 A1 * | 4/2010 | Hauser | 340/657 |
| 2011/0193524 A1 * | 8/2011 | Hazzard et al. | 320/114 |
| 2011/0267782 A1 * | 11/2011 | Petrick et al. | 361/724 |
| 2011/0309591 A1 * | 12/2011 | Petrick et al. | 280/47.35 |
| 2012/0019117 A1 | 1/2012 | Dunwoody | |
| 2012/0087074 A1 * | 4/2012 | Chen | 361/679.02 |
| 2012/0262120 A1 * | 10/2012 | Dresser, III | 320/115 |
| 2013/0175993 A1 * | 7/2013 | Chen | 320/114 |
| 2013/0277930 A1 * | 10/2013 | Ergun et al. | 280/47.35 |

OTHER PUBLICATIONS

Invitation and Partial Search Report for International Application No. PCT/US2013/053256 dated Nov. 11, 2013, 6 pages.

"International Application Serial No. PCT/US2013/053256, International Search Report mailed Feb. 24, 2014", 6 pgs.

"International Application Serial No. PCT/US2013/053256, Written Opinion mailed Feb. 24, 2014", 10 pgs.

"European Application Serial No. 13752714.9, Response filed Aug. 3, 2015 to Office Action mailed Mar. 24, 2015", 20 pgs.

"Australian Application Serial No. 2013296357, First Examiner Report mailed Dec. 3, 2015", 4 pgs.

* cited by examiner

CART WITH CABLE MANAGEMENT SYSTEM

CROSS-REFERENCE TO RELATED APPLICATION

This application claims the benefit of U.S. Provisional Patent Application No. 61/678,302 filed Aug. 1, 2012 which is incorporated herein in its entirety by reference.

FIELD

The invention generally relates to carts with cable management systems.

BACKGROUND

There are many situations in which multiple electronic devices (e.g., notebook computers, netbook computers, tablet computers, and other handheld devices) are simultaneously used. Carts are useful for storing, charging, and updating a plurality of electronic devices. Typical carts are cabinets with shelves for the electronic devices to rest on. Generally, each electronic device must be individually connected to power and/or network cables, and such cables are routed within the cart to various outlets.

SUMMARY

Embodiments of the invention include a cable management system for a cart. In some embodiments, the invention includes a cart with more than one of a power supply system that includes an outlet box and a plurality of flexible receptacles, a cart with a bi-layer shelf, a cart with a positionable cable routing tray, and/or a cart with a removable cable management module. Embodiments of the invention also include methods of using any of the carts described herein.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
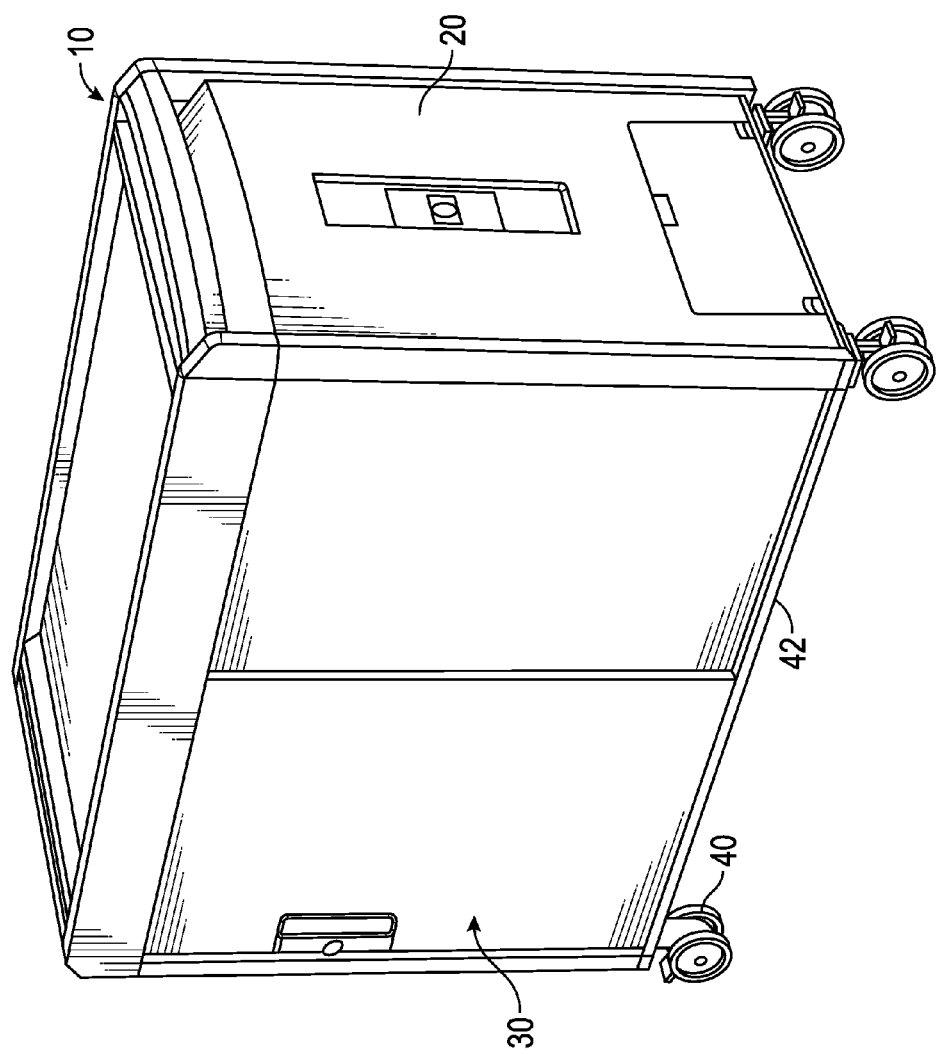
FIG. 1 shows a perspective view of an exemplary cart in accordance with an embodiment of the invention.

As shown in FIG. 1, some embodiments of the invention include a storage and charging cart 10 useful for storing and charging a plurality of electronic devices 16 (not shown in FIG. 1), such as notebook computers, netbook computers, tablet computers, and other handheld devices. As shown, a representative cart 10 can include a cabinet 20 defining an interior space for storing a plurality of electronic devices, one or more doors 30 to provide selective access to the interior space, and one or more wheels 40 supporting a base 42 to increase portability. The cart can be configured to hold as many electronic devices as desired. In some embodiments, the cart holds at least 10 electronic devices in its interior space. In other embodiments, the cart is configured to hold between 10 and 40 (e.g., 20 and 30) electronic devices in its interior space.

A power supply system can be provided for charging the plurality of electronic devices when stored within the interior space. The power supply system is useful for recharging the batteries of the electronic devices stored in the cart. The power supply system includes a device to receive power into the cart, such as a male power cord extending from the cart or a female receptacle in or on the cart. Embodiments of the power supply system ultimately route the power to each electronic device stored within the cart via a cable 50 (e.g., a power cable or a network connection cable combined with a power cable), as depicted in FIG. 2.

Further, in some embodiments a network connection system can be provided for connecting the plurality of electronic devices to a network when stored within the interior space. In some embodiments, a network connection cable can be provided to each electronic device to connect the electronic device to the network. For some electronic devices, the network connection cable may be combined with the power cable. For other electronic devices, the network connection cable may be separate from the power cable. Ultimately, embodiments of the cart allows for communication between each electronic device stored in the cart and the network. Such a connection is useful for providing software updates to the electronic devices when they are not in use. Of course, the cart can provide each electronic device with other connections.

Figure 4:
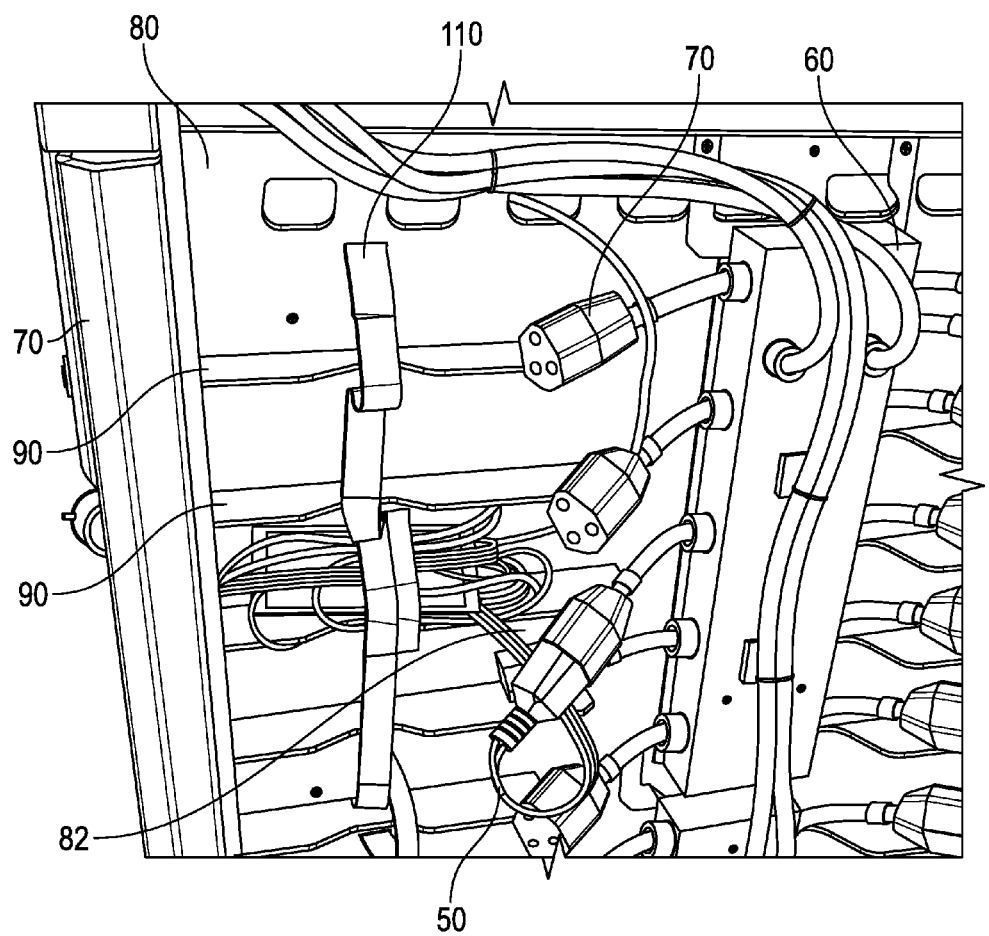
FIG. 4 shows a power supply system that includes an outlet box and a plurality of flexible receptacles in accordance with an embodiment of the invention.
Figure 5:
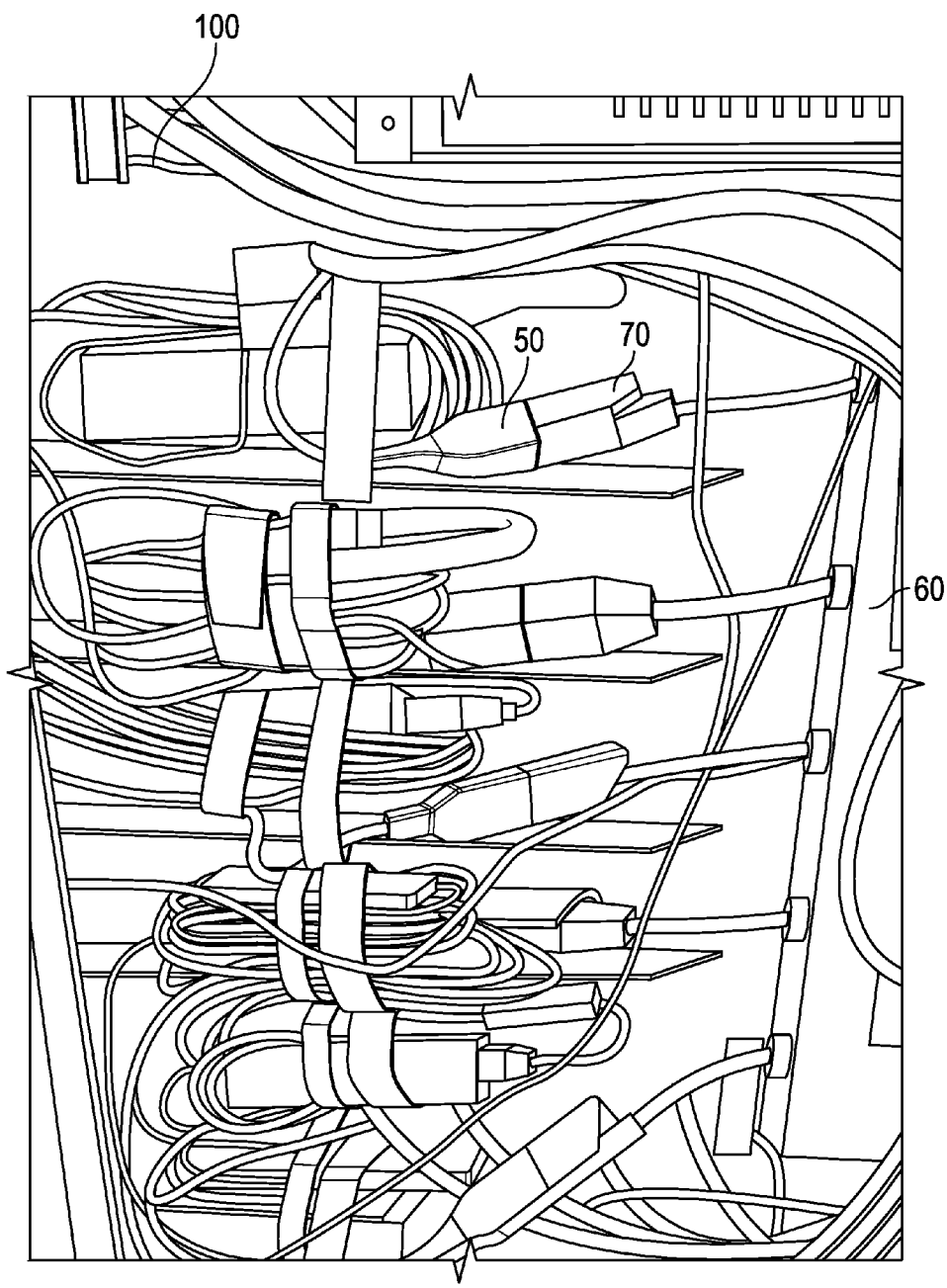
FIG. 5 shows a power supply system that includes an outlet box and a plurality of flexible receptacles in accordance with an embodiment of the invention.
Figure 6:
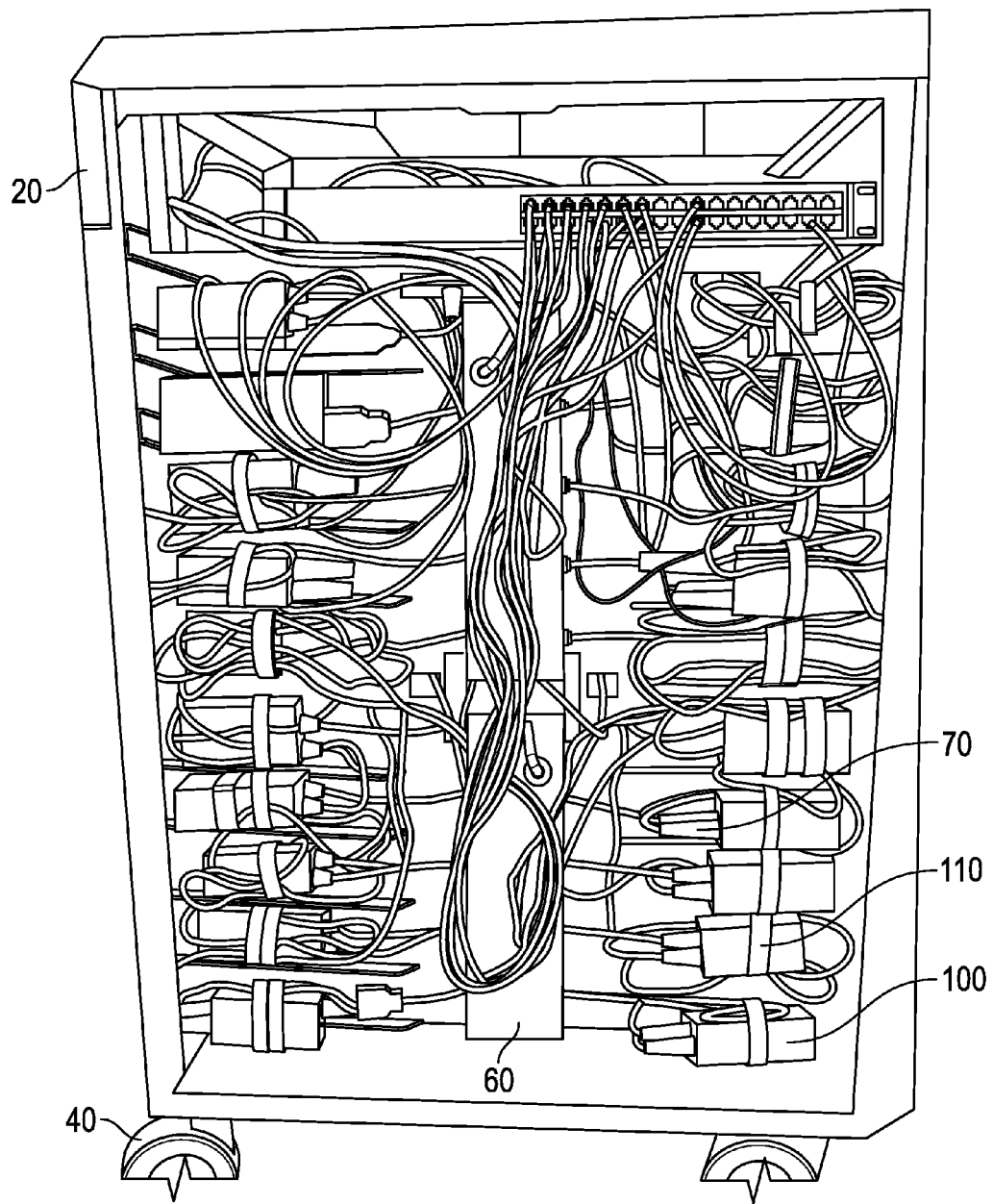
FIG. 6 shows a cart with a power supply system that includes an outlet box and a plurality of flexible receptacles in accordance with an embodiment of the invention.

FIGS. 2-6 show an interior of a cart 10 with a power supply system that includes an outlet box 60 and a plurality of flexible receptacles 70. As shown in FIG. 6, more than one outlet box can be provided (e.g., such as one outlet box per level of stored electronic devices, such as two). In some embodiments, the flexible receptacles take the form of flexible cables having a length extending from the box with a female prong receptacle at a distal end. The flexible receptacles facilitate the connection of the plurality of electronic devices to the power supply system, and allow for variously sized and shaped adaptors and power bricks (e.g., AC to DC converters) associated with electronic devices to be connected to the power supply system. In some embodiments, the external power source is connected to the outlet box 60 via one or more inlet cables 62, and the outlet box includes circuitry operative to divide and distribute power to each of the flexible receptacles 70.

Figure 2:
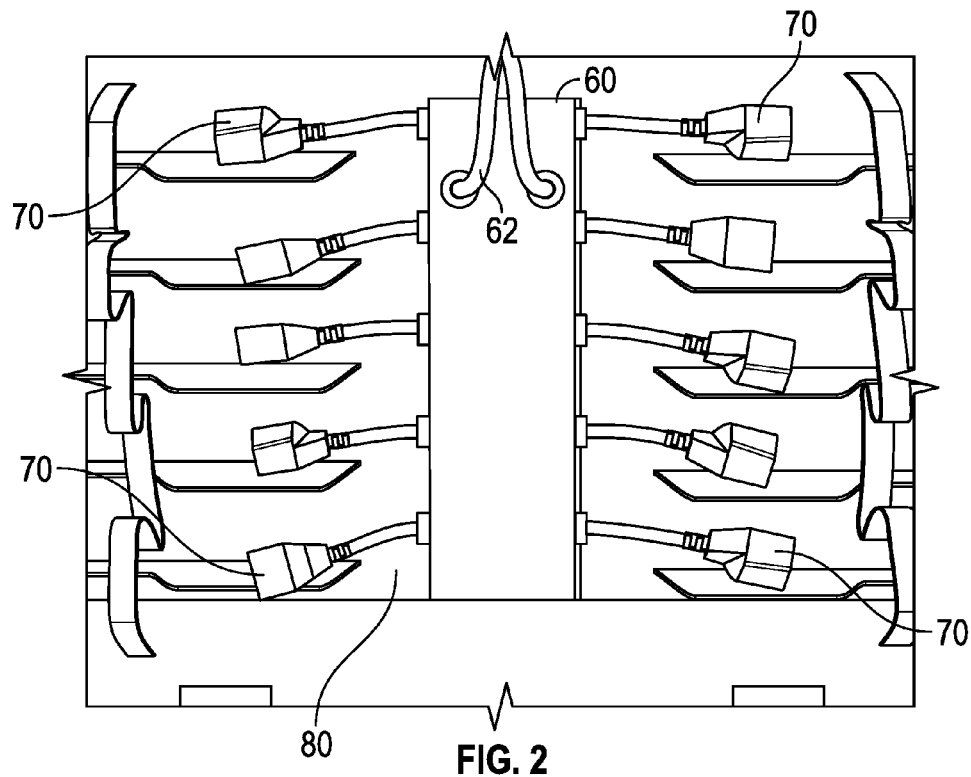
FIG. 2 shows a power supply system that includes an outlet box and a plurality of flexible receptacles in accordance with an embodiment of the invention.
Figure 3:
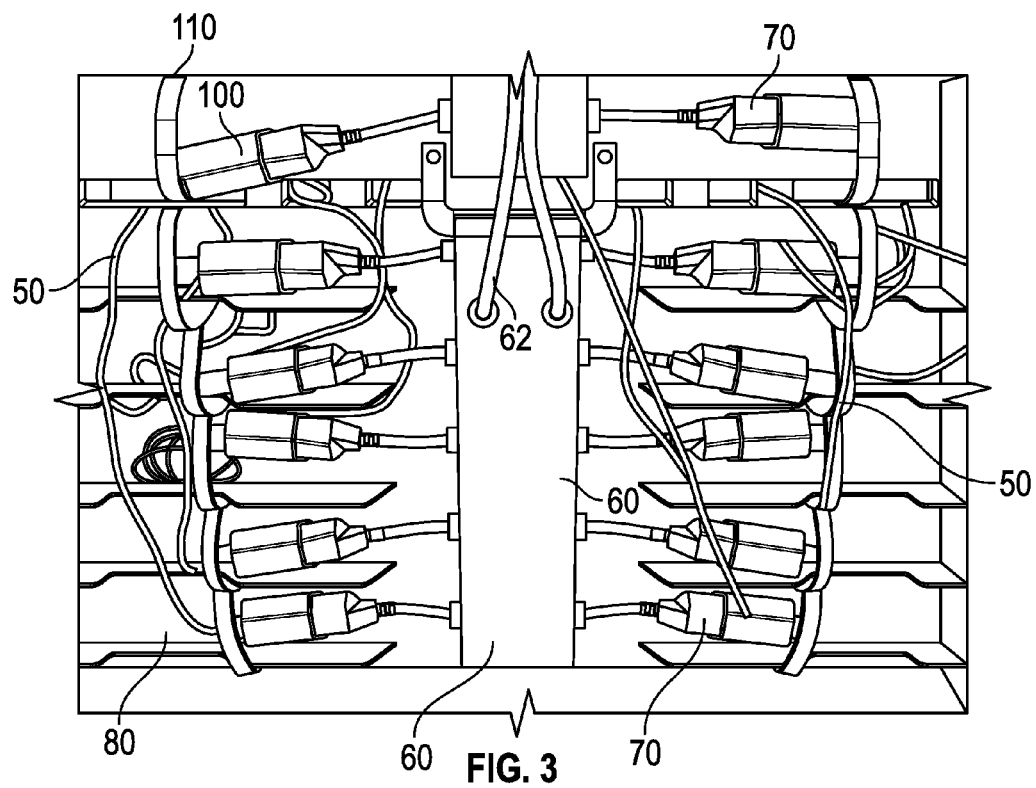
FIG. 3 shows a power supply system that includes an outlet box and a plurality of flexible receptacles in accordance with an embodiment of the invention.

FIGS. 2-4 show the outlet box 60 mounted proximate to a vertical surface 80 within the interior of the cart 10. In the embodiment shown, the electronic devices 16 can be stored on one side of the surface 80, and the outlet box 60 with flexible receptacles 70 can be stored on the other side of the surface. Apertures 82 may be provided to allow cables to traverse vertical wall 80. Cables 50 can be routed from the electronic devices though the surface to connect to the flexible receptacles. FIG. 3 shows four cables 50 associated with tablet computers 16 connected to four respective flexible receptacles 70. A panel, not shown in FIG. 3, can be used to enclose the space containing the outlet box.

FIG. 4 shows the vertical surface 80 with a plurality of shelves 90, each proximate a corresponding receptacle 70. The shelves 90 are useful for supporting a power brick 100 associated with an electronic device 16. In some embodiments, the shelves integrally formed with or connected to the vertical wall to present a horizontal surface, and are stacked vertically. In such embodiments, the electronic devices can be stored on one side of the surface 80, the outlet box 60 and flexible receptacles 70 can be stored on the other side of the surface, and bricks associated with each electronic device can be stored on the shelves 90. In some embodiments, each shelf 90 can be provided with a strap 110, such as a hook and loop strap, to further support the brick 100. FIGS. 5 and 6 show a plurality of bricks held within the wall and connected to a plurality of corresponding flexible receptacles. In some embodiments, power is supplied from an external source to the outlet box and from the outlet box to the power bricks as described above. In certain embodiments, the outlet from the power bricks is routed through shelves or trays to be connected to electronic devices within the cart.

Figure 7:
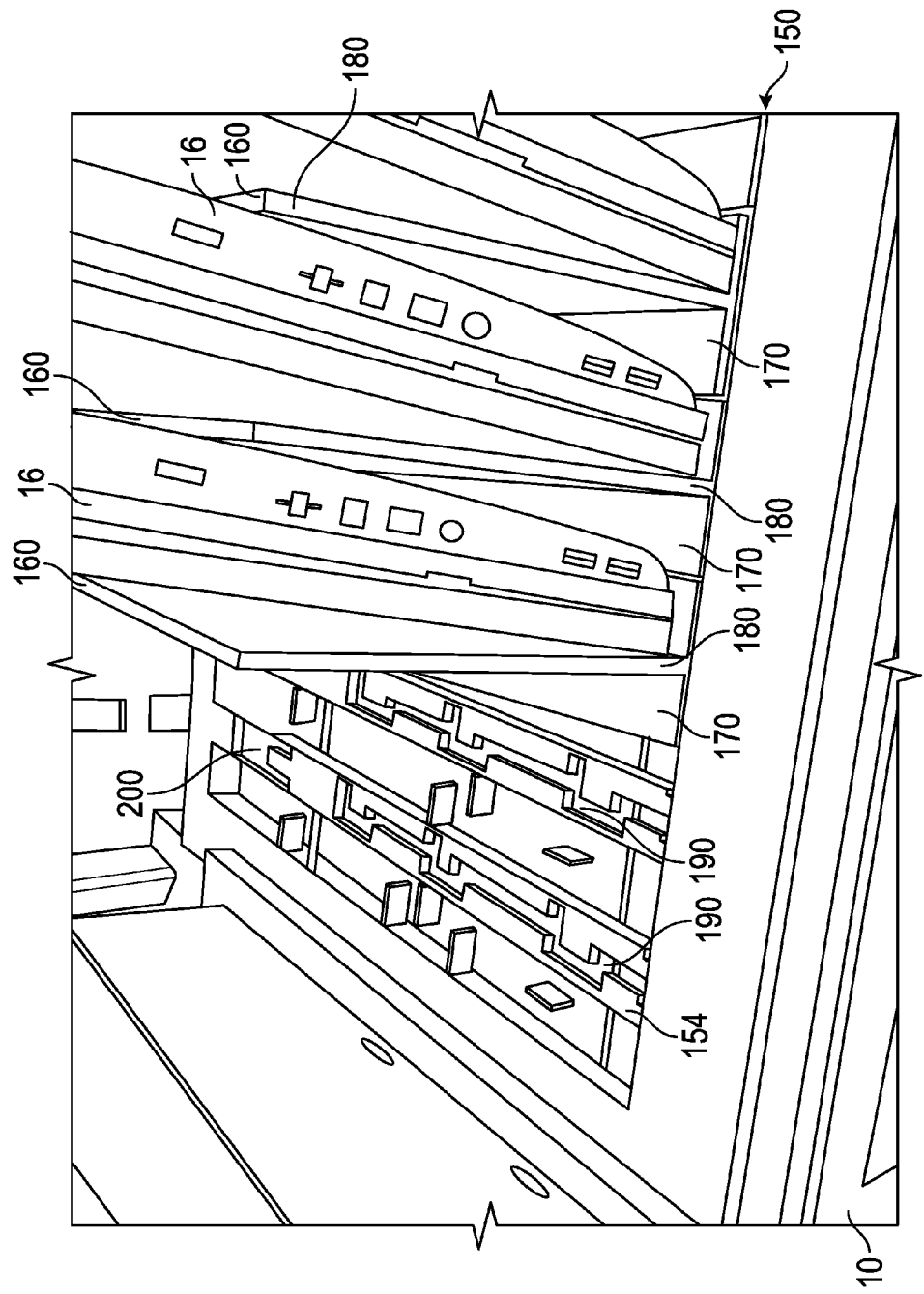
FIG. 7 shows a bi-layer shelf in accordance with an embodiment of the invention.

As shown in FIGS. 7-9B, some embodiments of the invention include a cart 10 with a bi-layer shelf 150. FIG. 7 shows a portion of a bi-layer shelf in accordance with an embodiment of the invention. Cable management space and routing features may be provided in the space between the two layers. Cables routed through the bi-layer shelf as described herein are useful for positioning the cables proximate a door of the cabinet and a group of electronic devices such that a user can easily connect the cables to the electronic devices.

As shown, the bi-layer shelf 150 includes a lower layer 154 configured to receive a plurality of dividers 160 with a generally horizontal portion 170 and a generally vertical portion 180 to separate the plurality of electronic devices 16. The dividers 160 are received and connect to engagement features 190 in the lower level of the bi-layer shelf. In some embodiments, the plurality of horizontal portions 170 form an upper layer of the bi-layer shelf after the dividers are engaged with the lower layer. In some embodiments, a user aligns engagement features and slides the divider forward until a member 200 moves into an engagement position to secure the divider. The divider can be released by actuating the member to a disengaged position.

Figure 8:
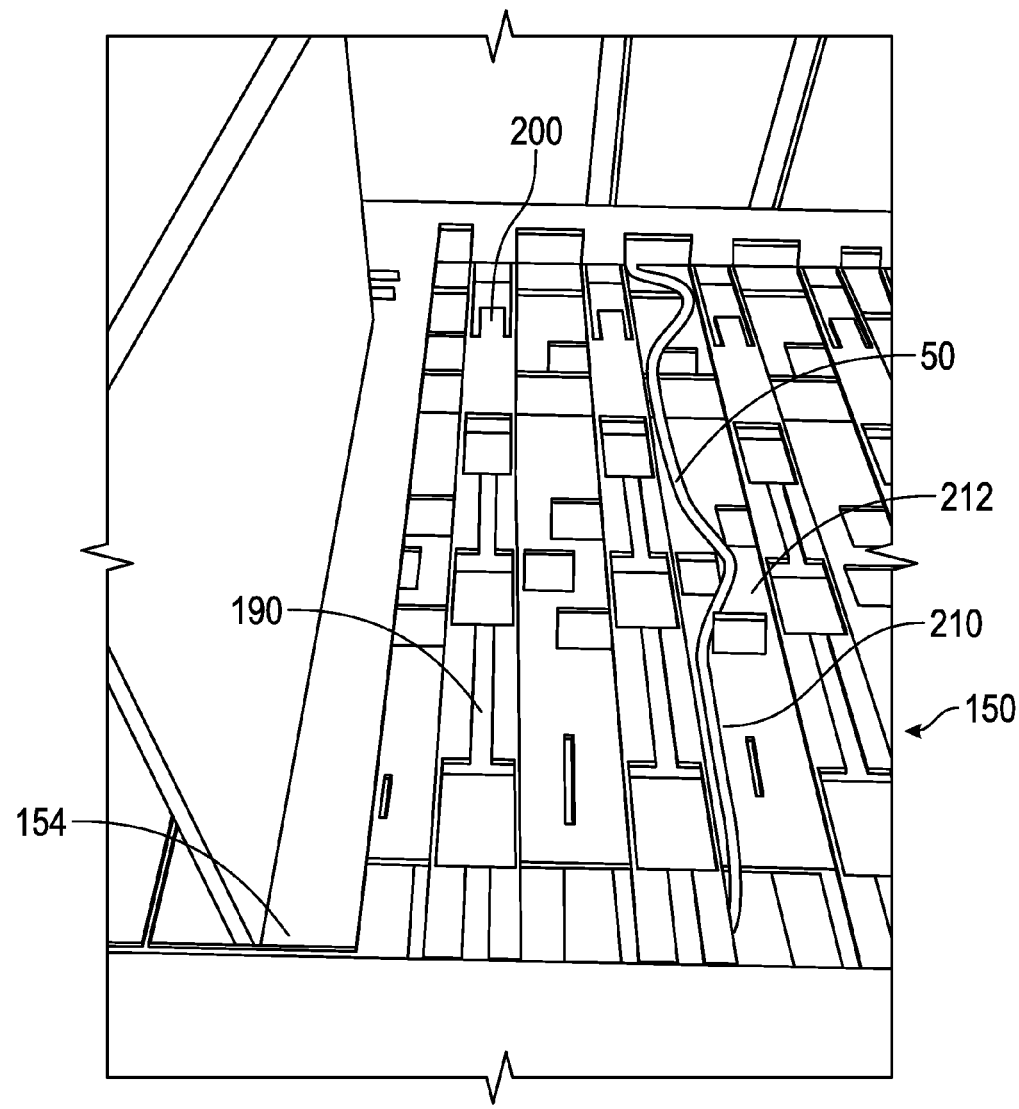
FIG. 8 shows a bi-layer shelf in accordance with an embodiment of the invention.
Figure 9B:
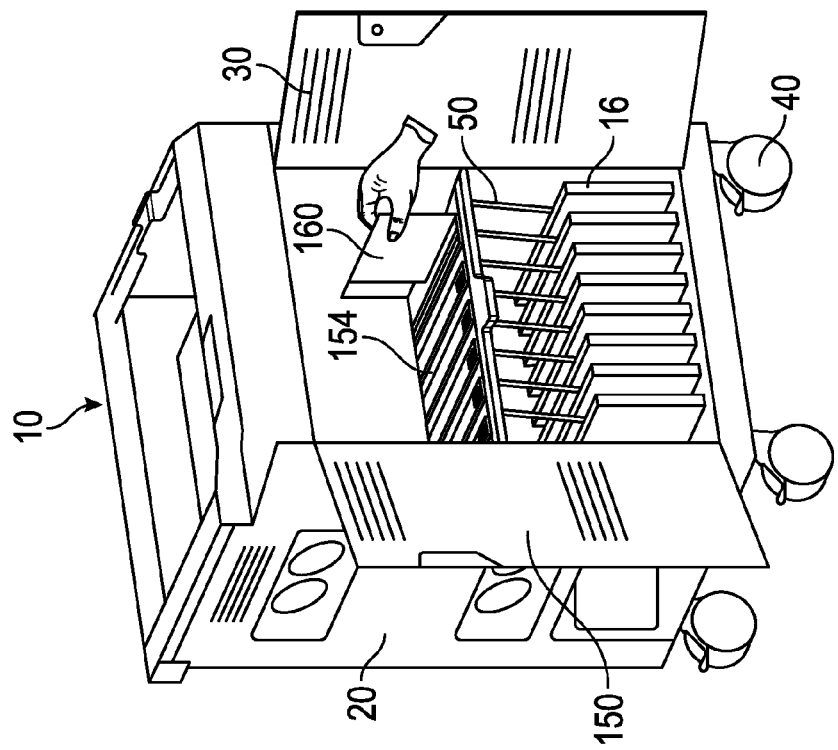
FIG. 9B shows a cart with a bi-layer shelf in accordance with an embodiment of the invention.
Figure 9A:
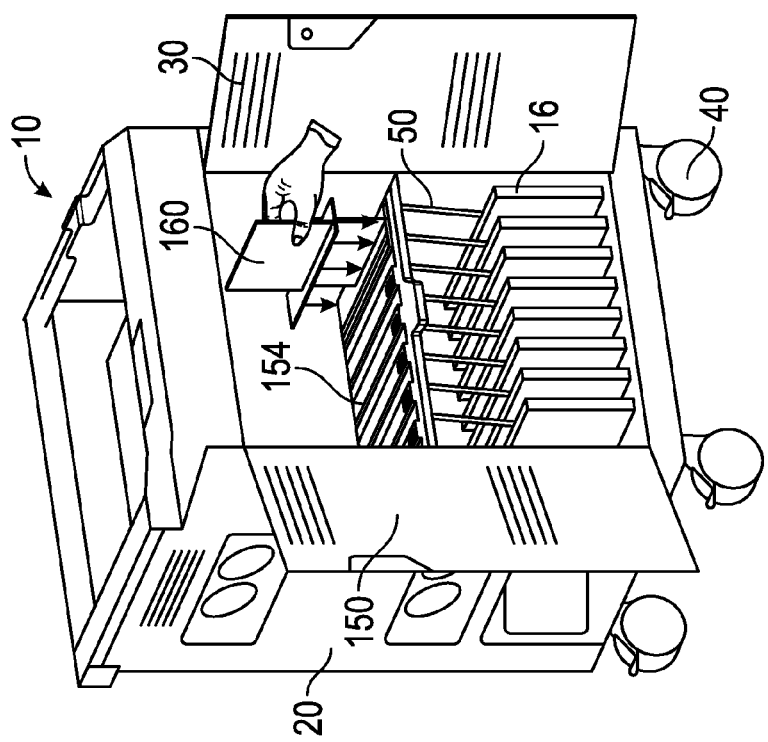
FIG. 9A shows a cart with a bi-layer shelf in accordance with an embodiment of the invention.

FIG. 8 shows the lower layer 154 of the shelf 150 with all dividers removed and a routed cable 50. In the embodiment shown, cable routing features such as channels 210 and cleats 212 are included in the lower layer beneath a generally horizontal portion of the dividers that segregate the laptops. Cables 50, such as power and network cables, can be through the space between the two layers of the shelf, and ultimately connected to the network system and/or the power system. In some embodiments, power is supplied from an external source to an outlet box and from the outlet box to power bricks as described above. In some embodiments, the outlet from the power bricks is routed through the bi-layer shelf to be connected to the electronic devices within the cart, such as electronic devices supported by the base of the cart. FIGS. 9A and B demonstrate inserting the dividers 160 with the generally horizontal portion to create the bi-layer shelf and enclose the routed cables within the space between the two layers.

Figure 10A:
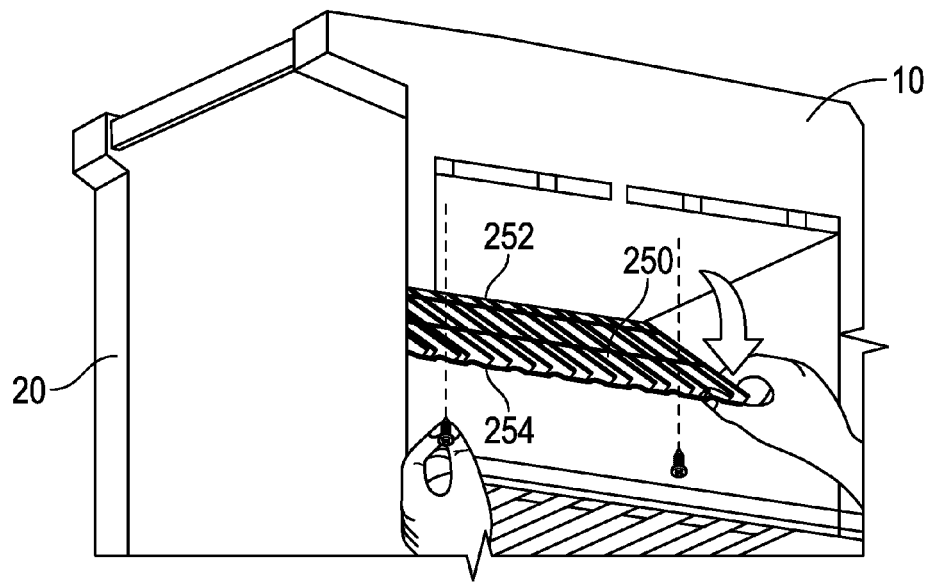
FIG. 10A shows a cart with a positionable cable routing tray in accordance with an embodiment of the invention.
Figure 10B:
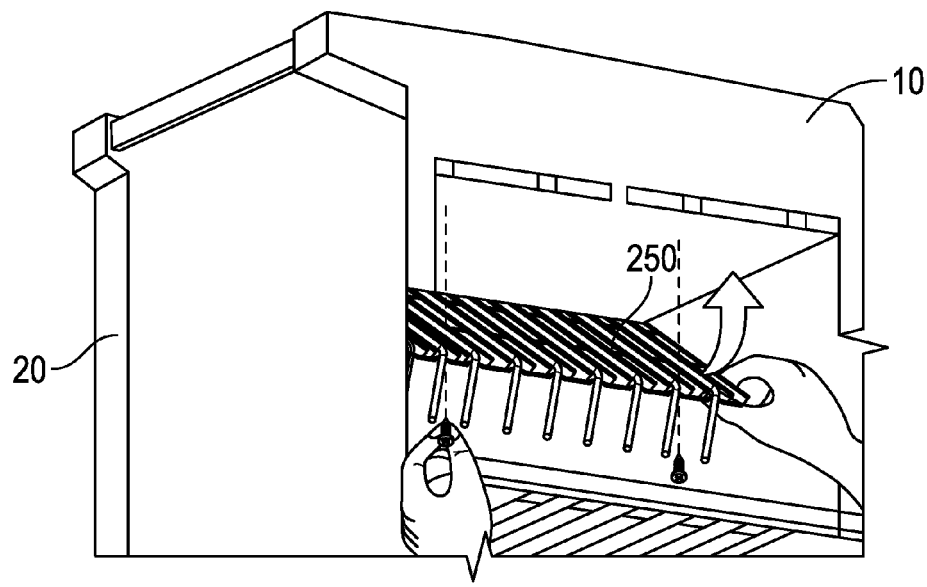
FIG. 10B shows a cart with a positionable cable routing tray in accordance with an embodiment of the invention.
Figure 10C:
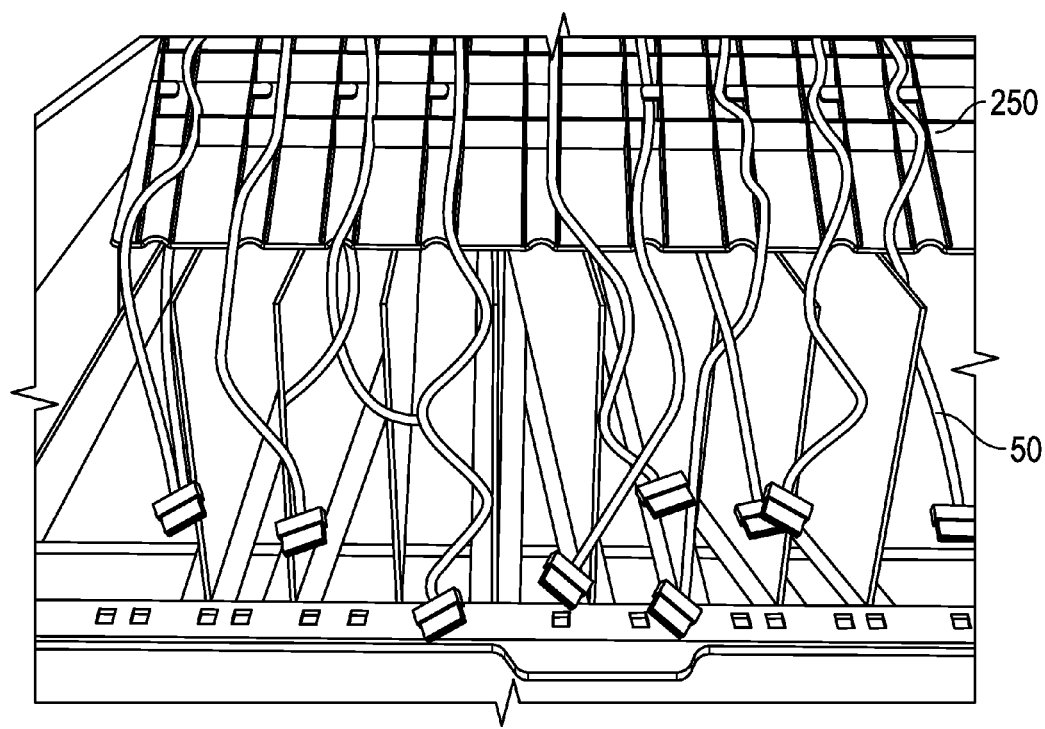
FIG. 10C shows a cart with a positionable cable routing tray in accordance with an embodiment of the invention.
Figure 11:
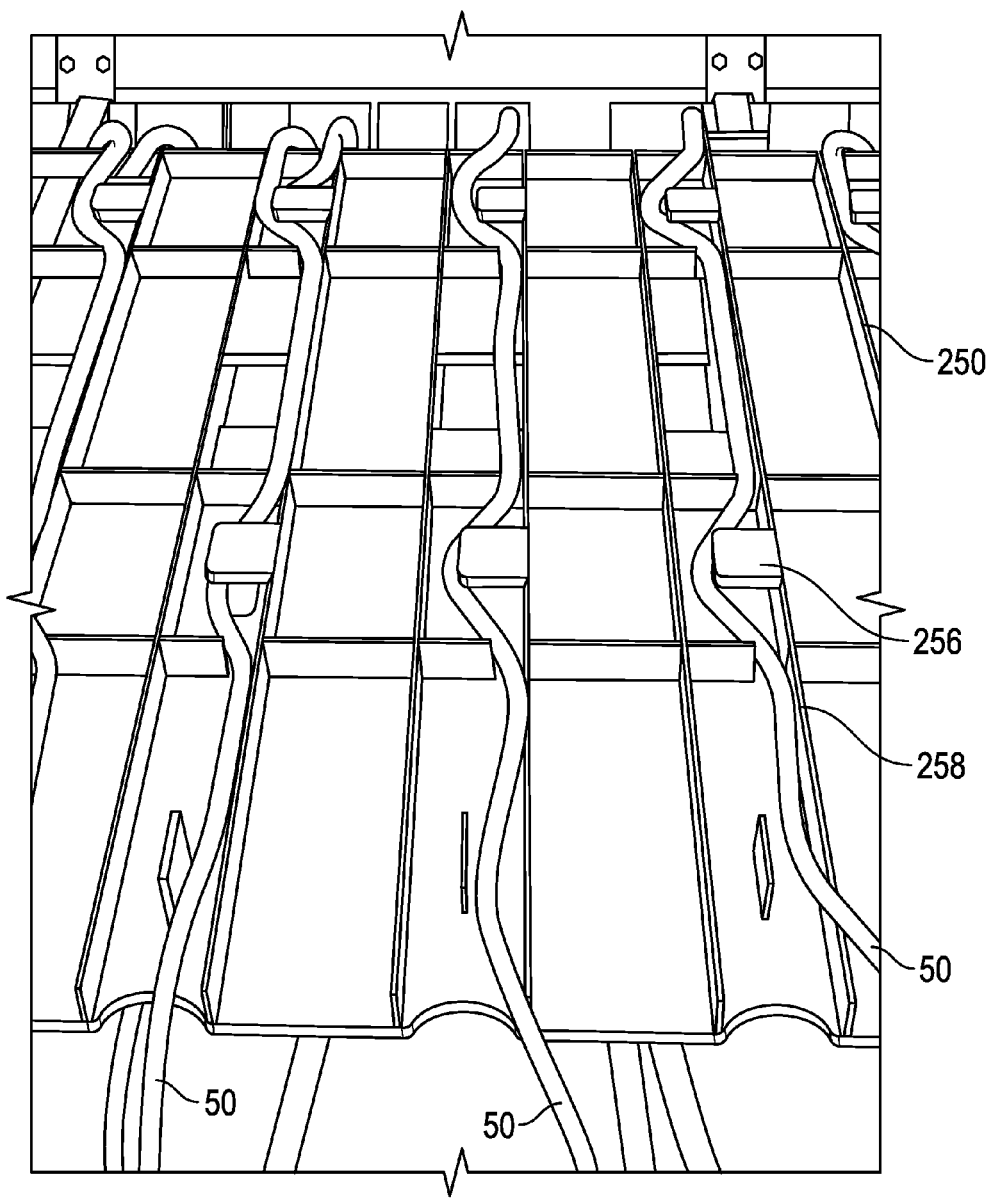
FIG. 11 shows a positionable cable routing tray in accordance with an embodiment of the invention.
Figure 12:
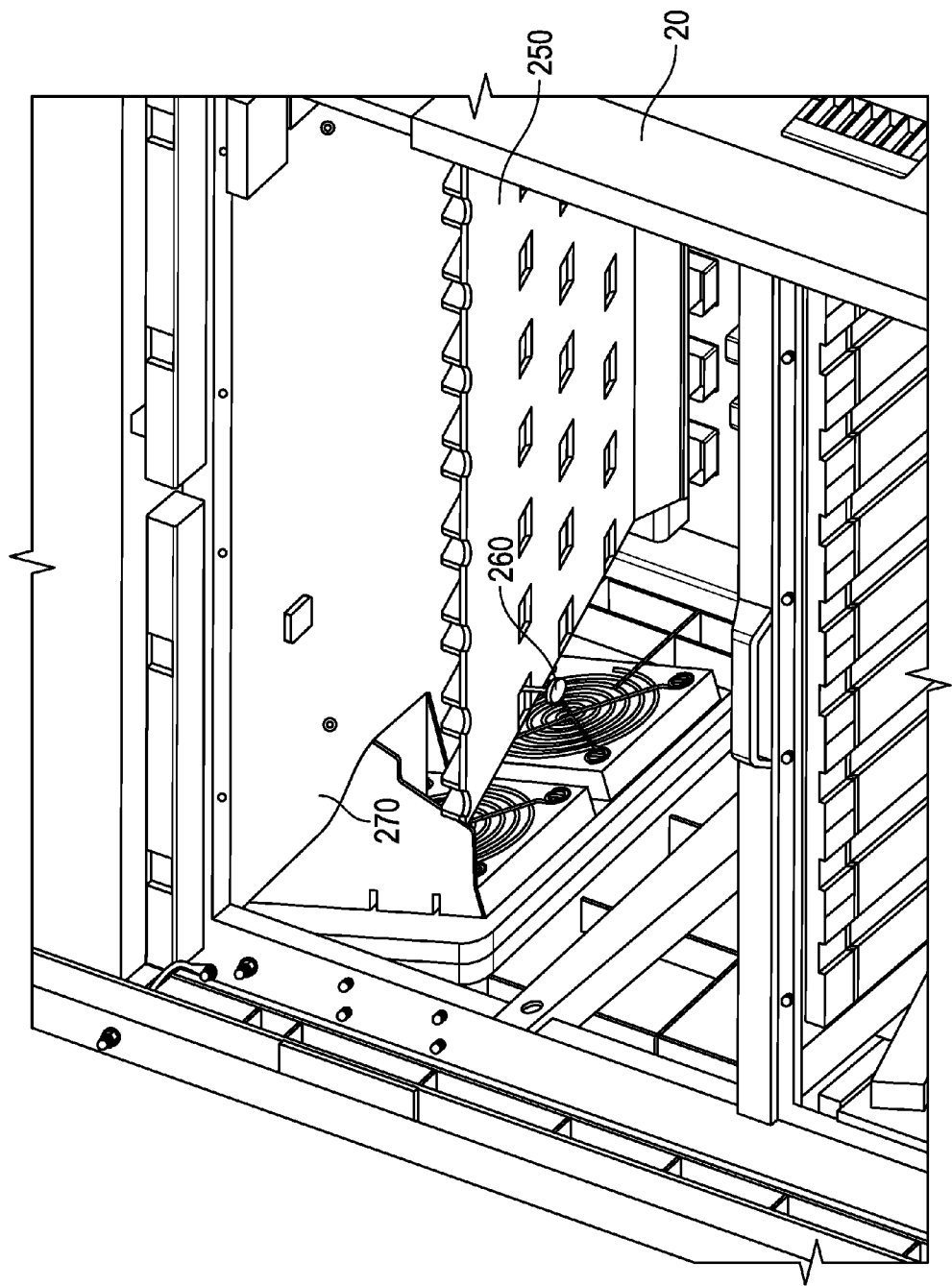
FIG. 12 shows a cart with a positionable cable routing tray in accordance with an embodiment of the invention.

FIGS. 10A-14B show an embodiment of a cart 10 that includes a positionable cable routing tray 250. In some embodiments, the cable routing tray is positionable (e.g., pivotable) from a generally horizontal position to a generally inclined position. In the embodiment shown, the cable routing tray pivots downward from a horizontal position generally parallel with a top of the cart down to an inclined position skewed from the top of the cart. As shown in FIG. 10A, a first edge 252 can be rotatably engaged with at least a portion of the cabinet, and a second edge 254 opposite the first edge can be pivotable about the first edge about a generally horizontal axis from a generally horizontal position to a generally inclined position. Cables 50, such as power and network cables, are accessible to be routed with the tray is in the inclined position and ultimately connected to the network system and/or the power system. In use, a user would lower the cable routing tray, route cables along an upper surface of the tray, such as trough a plurality of channels 256 and/or cleats 258 as shown in FIG. 11, and reattach the tray to secure it in a horizontal position to enclose the routed cables. FIG. 11 shows cable routed along the upper surface of the tray. Cables routed through the positionable cable routing tray as described herein are useful for positioning the cables proximate a door of the cabinet and a group of electronic devices such that a user can easily connect the cables to the electronic devices.

The cable routing tray can be secured to the cart in the horizontal position by any suitable method. In the embodiment shown in FIG. 12, the tray includes one or more thumb screws 260 to engage with a tap 270 on the cart.

Figure 13:
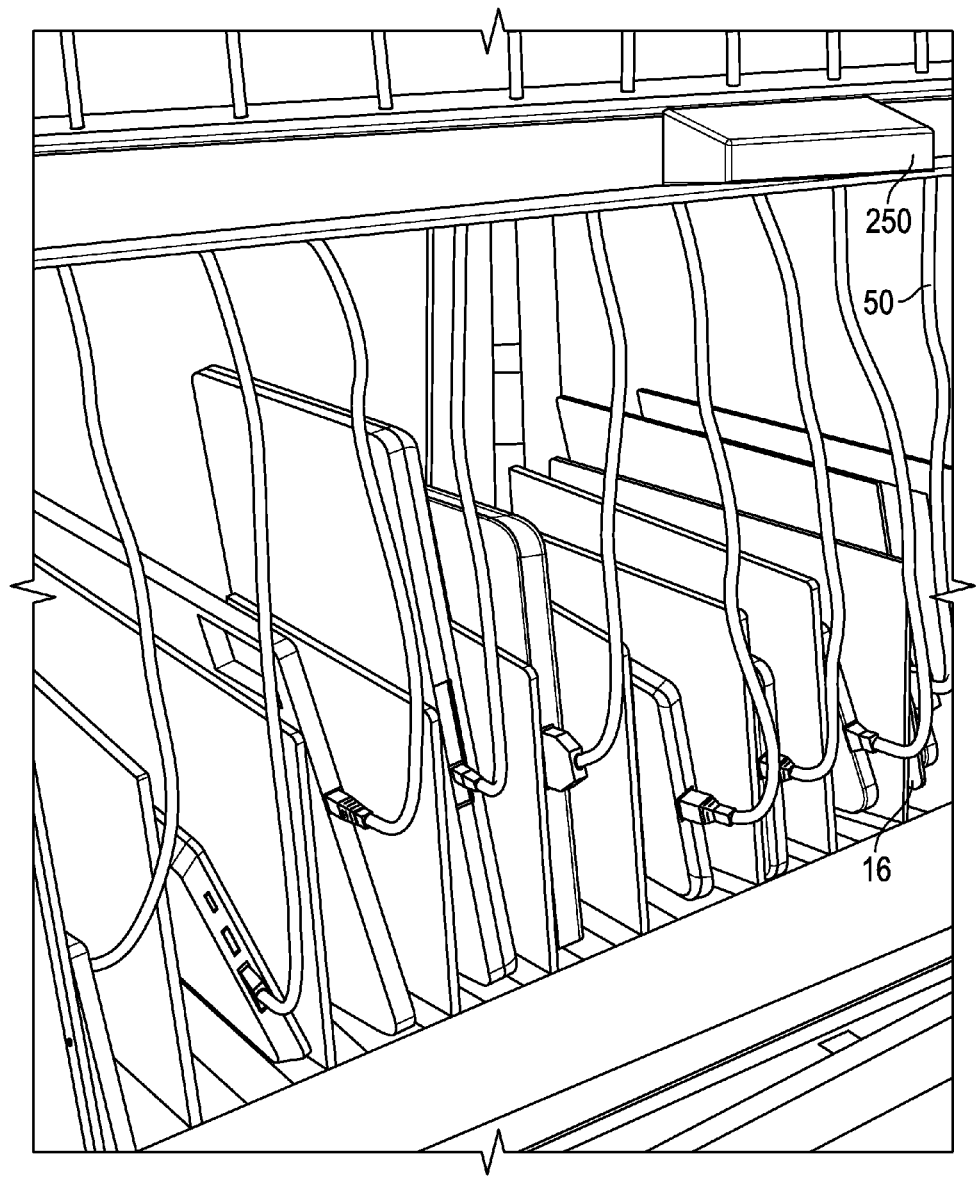
FIG. 13 shows a positionable cable routing tray in accordance with an embodiment of the invention.
Figure 14A:
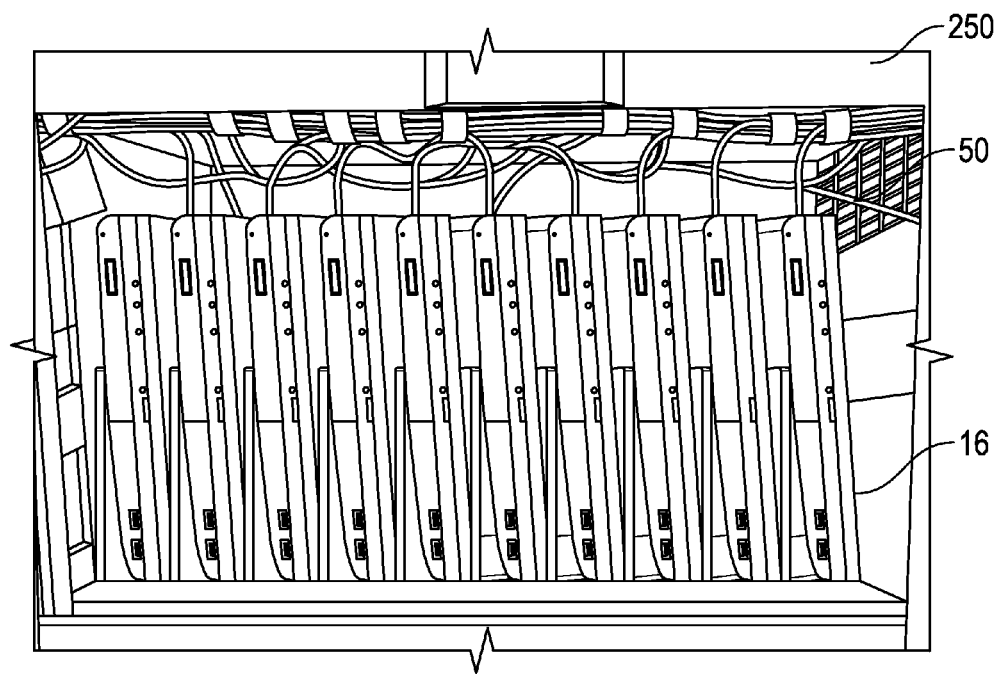
FIG. 14A shows a positionable cable routing tray in accordance with an embodiment of the invention.
Figure 14B:
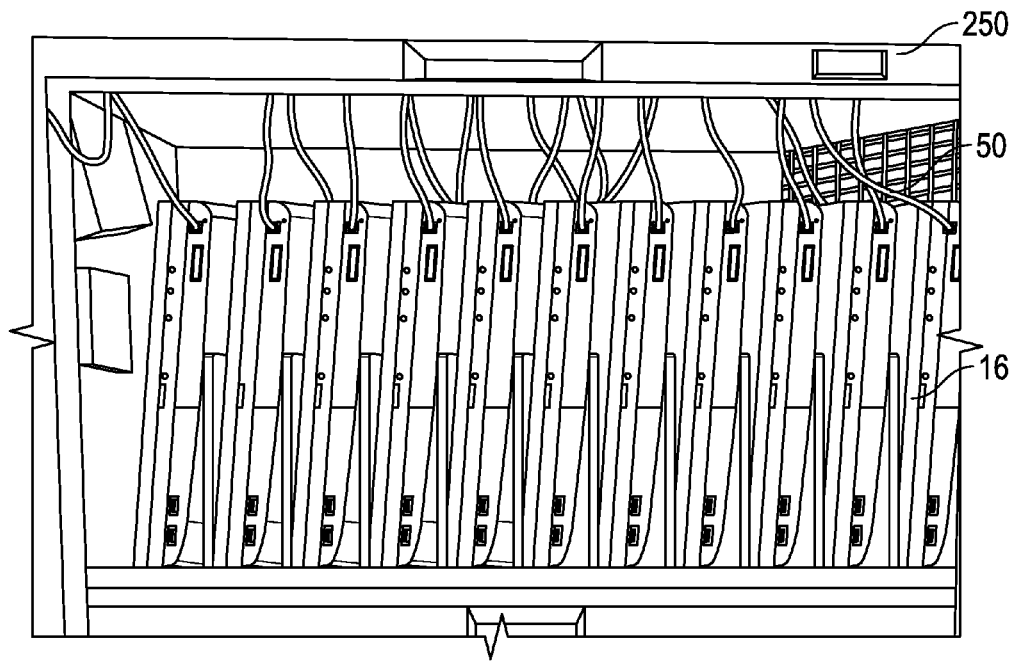
FIG. 14B shows a cart with a positionable cable routing tray in accordance with an embodiment of the invention.

FIG. 13 shows the cable routing tray 250 in the horizontal secured position with cables extending from the tray and connected to electronic devices, in this example, tablets. FIGS. 14A and B show the cable routing tray 250 in the horizontal secured position with cables 50 extending from the tray and connected to electronic devices 16, in this example, notebooks. In some embodiments, power is supplied from an external source to an outlet box and from the outlet box to power bricks as described above. In some embodiments, the outlet from the power bricks is routed through the cable routing tray to be connected to the electronic devices within the cart, such as electronic devices supported by the base of the cart or a shelf of the cart (e.g., a bi-layer shelf such as described above).

Figure 15:
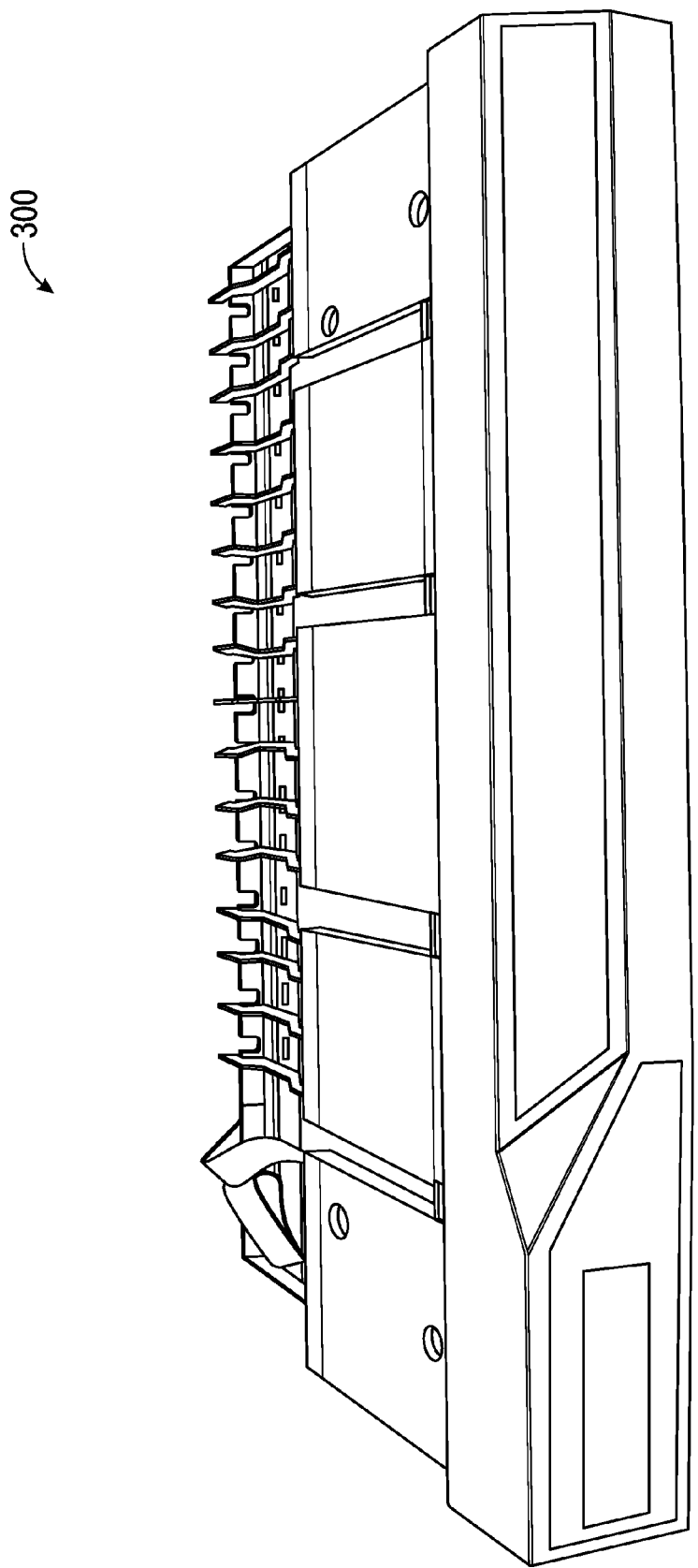
FIG. 15 shows a front view of a cable management module before cabling in accordance with an embodiment of the invention.
Figure 16:
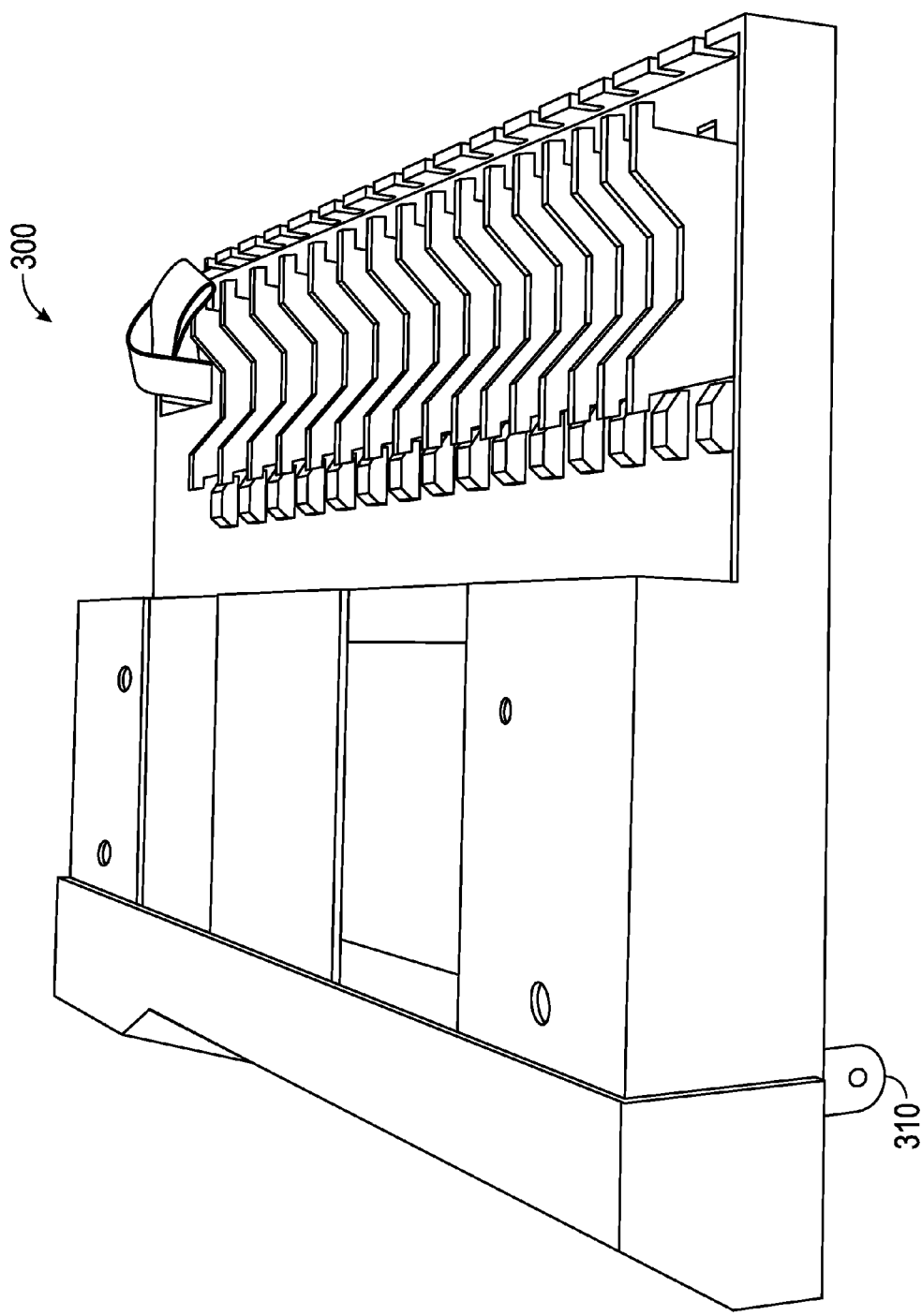
FIG. 16 shows a side view of a cable management module before cabling in accordance with an embodiment of the invention.
Figure 17:
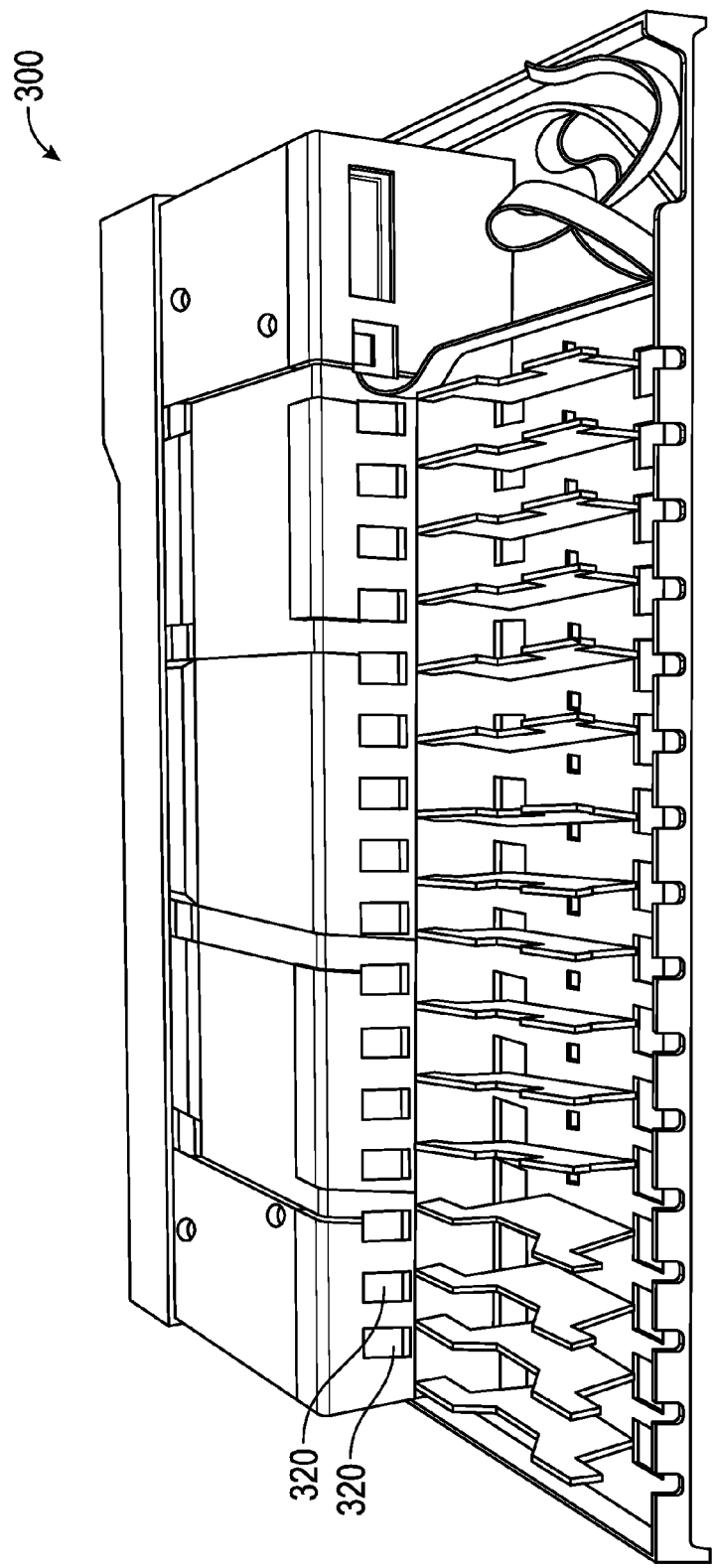
FIG. 17 shows a rear view of a cable management module before cabling in accordance with an embodiment of the invention.
Figure 18:
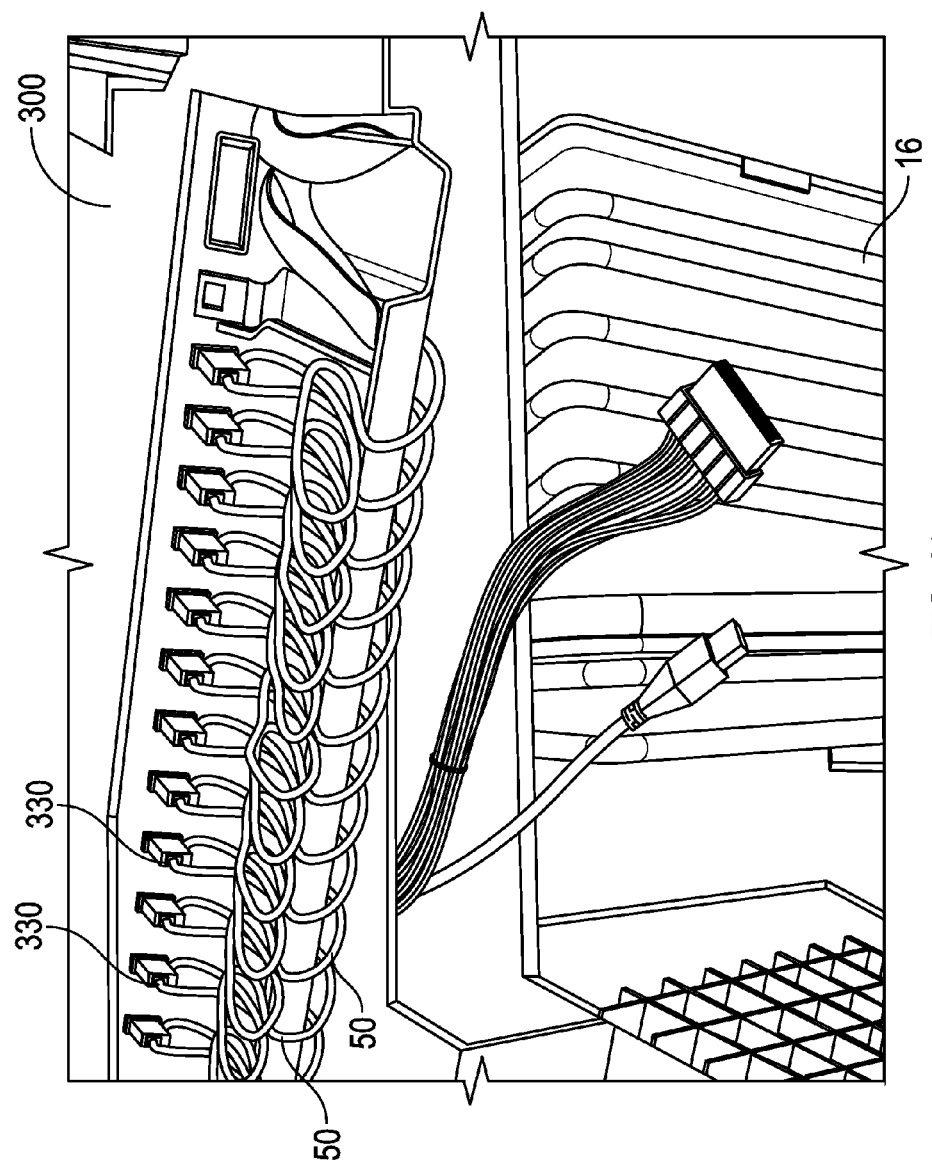
FIG. 18 shows a rear view of a cable management module after cabling in accordance with an embodiment of the invention.
Figure 19:
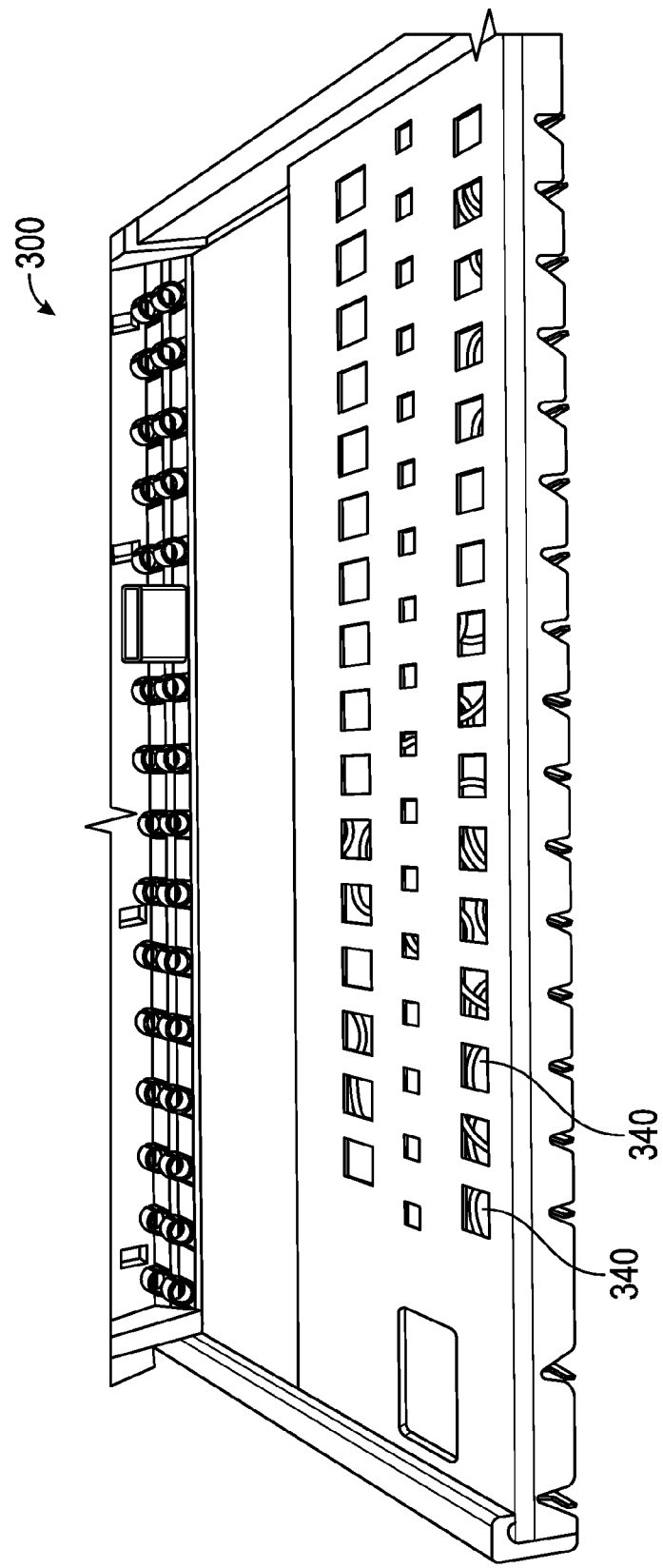
FIG. 19 shows a bottom view of a cable management module before cabling in accordance with an embodiment of the invention.
Figure 20:
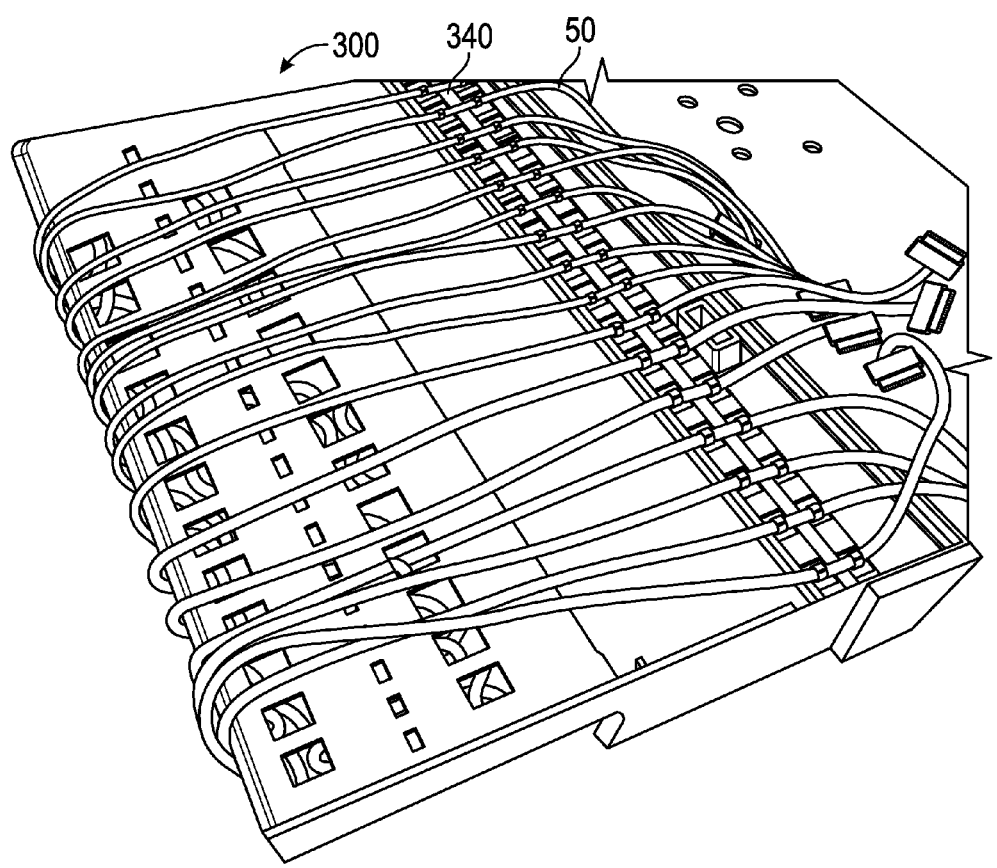
FIG. 20 shows a bottom view of a cable management module after cabling in accordance with an embodiment of the invention.
Figure 21:
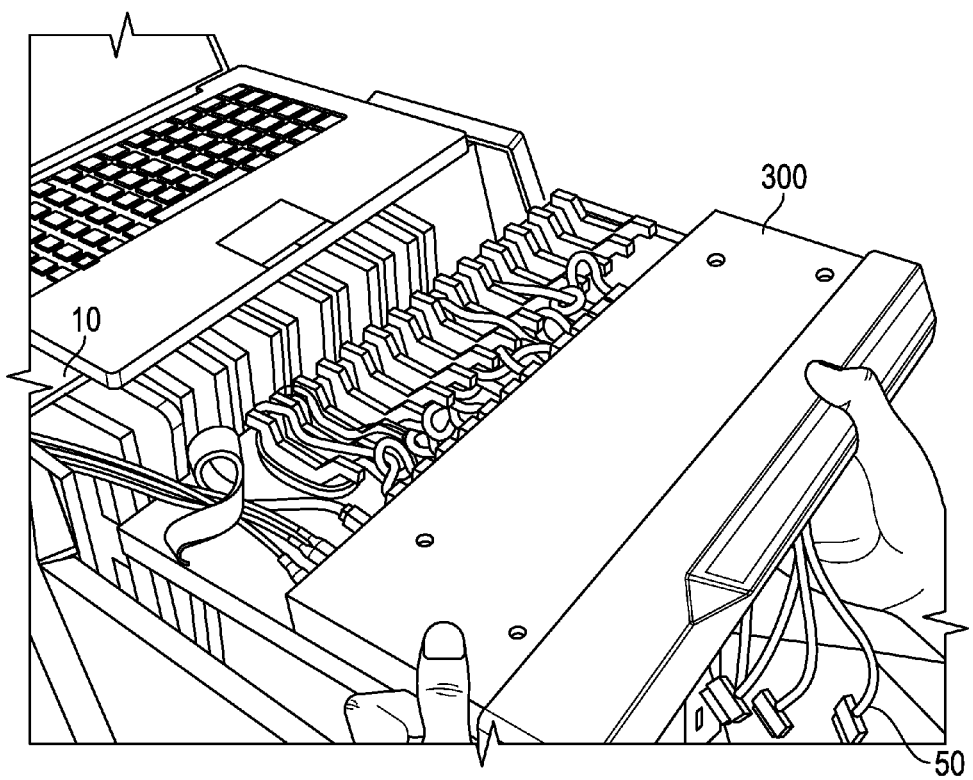
FIGS. 21 and 22 show a cable management module in accordance with an embodiment of the invention being inserted into a cart.
Figure 22:
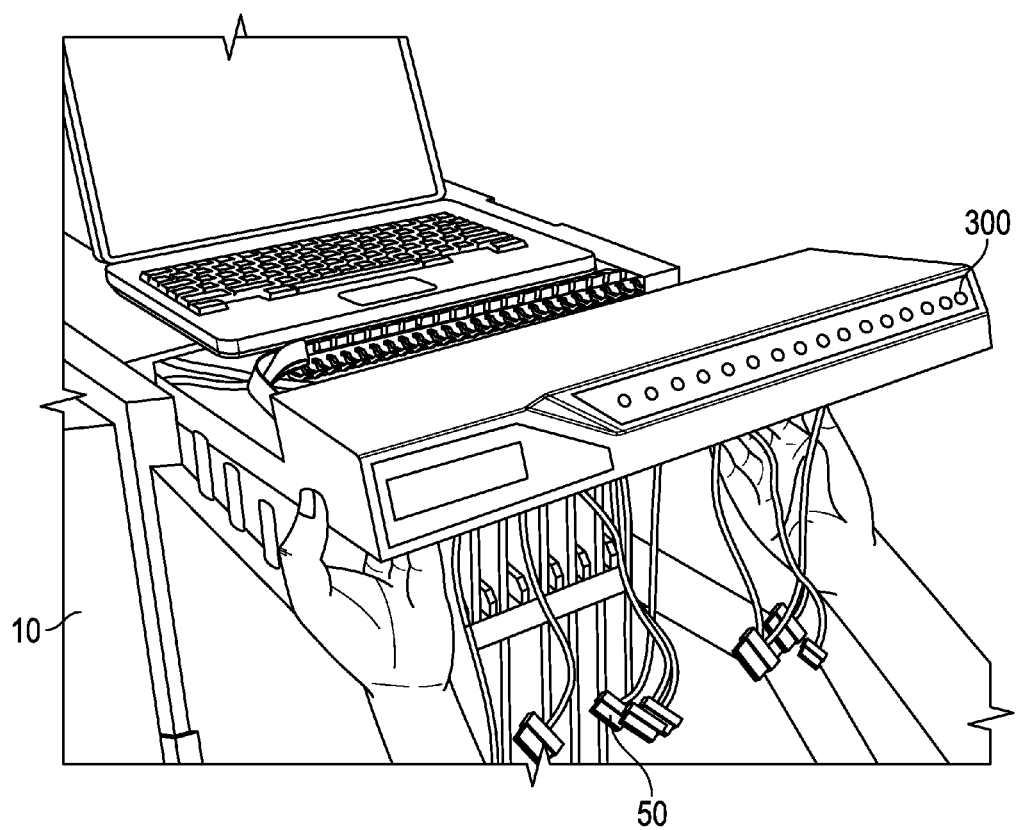
Figure 23:
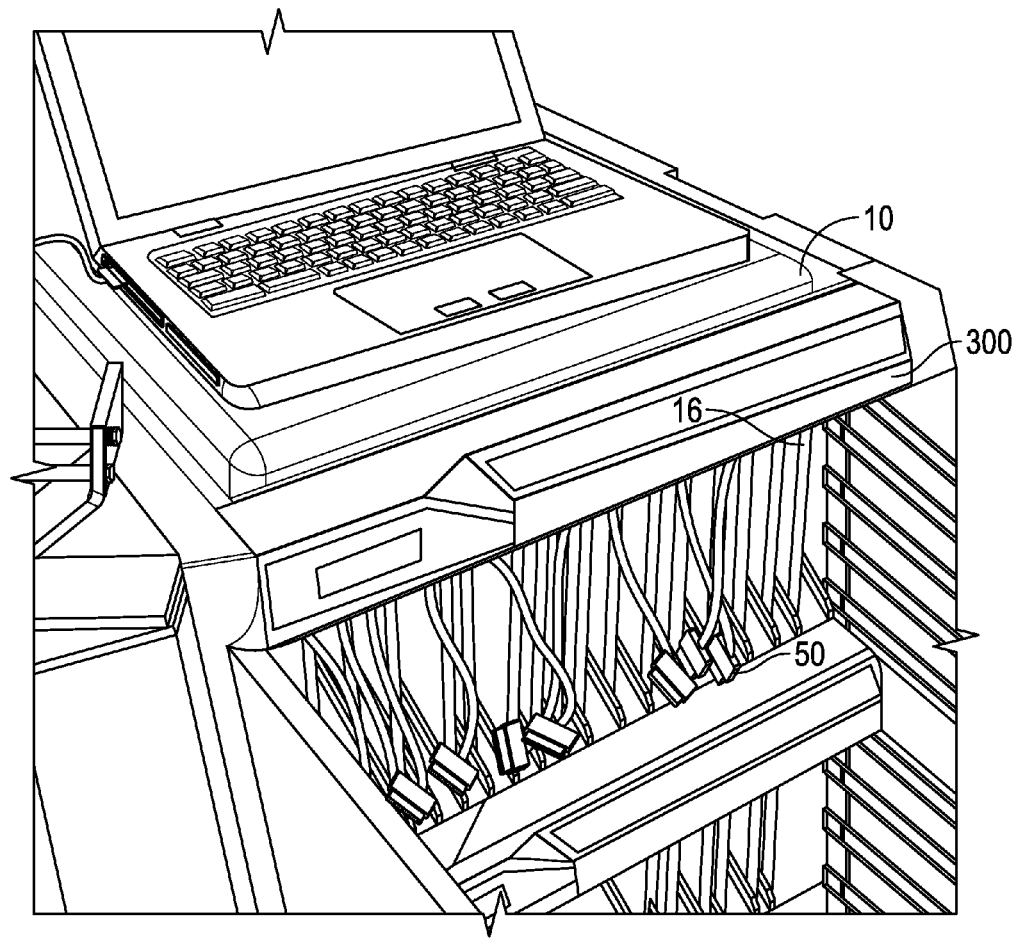
FIG. 23 shows a cable management module inserted into a cart in accordance with an embodiment of the invention with the cables positioned to be connected to electronic devices.

FIGS. 15-23 show a removable cable management module 300 for selective engagement with a cart 10 in accordance with an embodiment of the invention. In some embodiments, the module 300 includes electrical circuitry to charge and sync portable electronic devices. In certain embodiments, the module includes the power supply system and/or network connection system. In some embodiments, cables 50 associated with electronic devices 16 can be connected to the module 300 and routed through the module when the module is not connected to the cart. The module can then be connected to the cart. As shown, the cables 50 are appropriately positioned to connect to electronic devices to ultimately connect them to the power supply system and/or network system. FIG. 15 shows a front view of the cable management module 300 before cabling. FIG. 16 shows a side view of the module 300 before cabling. FIG. 17 shows a rear view of the module 300 before cabling. FIG. 18 shows a rear view of the module 300 after cabling. FIG. 19 shows a bottom view of the module 300 before cabling. FIG. 20 shows a bottom view of the module 300 after cabling. FIGS. 21 and 22 show the module 300 being inserted into a cart 10. FIG. 23 shows the module 300 inserted into a cart 10 with the cables 50 positioned to be connected to electronic devices.

In some embodiments the module 300 is adapted to slide into the cart 10 and can be guided by molded channels on the sides of the cart. After the module is inserted in to the cart, it can be secured to the cart by two screw receiving flanges 310 (e.g., one on each side) as shown in FIG. 16.

As shown in FIG. 17, the rear of the module 300 can include a connector slot 320 to receive a cable associated with each electronic device. As shown in FIG. 18, an end of cable 50 to charge and sync each device can be attached to the connector slot. Excess cable can be wrapped around bosses 330 on the back of the module as shown in FIG. 18, and then routed underneath the module. As shown in FIG. 19, one or more hooks 340 for each cable can be located on the bottom surface of the module. As shown in FIG. 20, cable 50 can be attached to the hooks 340. As shown in FIG. 22, another end of the cable 50 can hang loose below the module. When the portable electronic devices are attached to the cables, electronic circuitry inside the module can charge and sync each device.

Although the various cable management features described herein are independent of each other, a single cart may include any combination of them. Some embodiments of the invention include more than one cable management feature. For example, embodiments can include a cart with a power supply system that includes more than one of an outlet box and a plurality of flexible receptacles, a bi-layer shelf, a positionable cable routing tray, and a removable cable management module.

In some embodiments, the cart includes a power supply system and a cabinet having a bi-layer shelf positioned above a floor of the cabinet. The space between the bi-layer shelf and the floor is useful for storing a first group of electronic devices. Cables routed through the bi-layer shelf as described above are useful for positioning the cables proximate a door of the cabinet and the first group of electronic devices such that a user can easily connect the cables to the first group of electronic devices. Further, in some embodiments, a positionable routing tray can be positioned above the bi-layer shelf. The space between the positionable routing tray and the bi-layer shelf is useful for storing a second group of electronic devices. Cables routed through the positionable cable routing tray as described above are useful for positioning the cables proximate a door of the cabinet and the second group of electronic devices such that a user can easily connect the cables to the second group of electronic devices. Accordingly, in some embodiments, starting at a lowest portion of the cabinet and moving upward, the cabinet will include a base, bi-layer shelf, positionable shelf, and top. In certain embodiments, the vertical wall discussed above is also positioned within the interior space of the cart, such that its plane intersects both the bi-layer shelf and the positionable cable routing tray on a first side of the vertical wall. As described above, an outlet box with a plurality of flexible receptacles can be positioned on the other side of the vertical wall. In yet even other embodiments, a removable cable management module can be provided.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

We claim:

1. A cart for electronic devices, comprising:
 a cabinet defining an interior space for storing a plurality of electronic devices;
 one or more doors to provide selective access to the interior space;
 one or more wheels supporting the cabinet to increase a portability of the cart; and
 a power supply system having a plurality of cables for routing electrical power from an external source to each of the plurality of electronic devices, the power supply system including an outlet box within the interior space of the cart and a plurality of flexible receptacles extending from the outlet box, the plurality of flexible receptacles configured for facilitating connection of the plurality of electronic devices to the power supply system;

a bi-layer shelf comprising a lower layer configured for removably receiving and engaging a plurality of dividers, wherein each divider comprises a generally horizontal portion configured for being removably received and engaged in the lower layer and a generally vertical portion extending from the generally horizontal portion and configured for separating the plurality of electronic devices from each other when placed between adjacent dividers; and a positionable cable routing tray within the interior space, wherein the cable routing tray comprises a first edge rotatably engaged with at least a portion of the cabinet and a second edge opposite the first edge, wherein the second edge is pivotable about the first edge about a generally horizontal axis from a generally horizontal position to a generally inclined position and at least a portion of the cable routing tray proximate the second edge is configured for removable engagement with at least a portion of the cabinet when the cable routing tray is in the generally horizontal position.

2. The cart of claim 1, wherein the outlet box comprises circuitry operable to divide and distribute the electrical power to each of the plurality of flexible receptacles.

3. The cart of claim 1, further comprising a vertical wall within the interior space of the cart, wherein the outlet box is mounted proximate the vertical wall within the interior space.

4. The cart of claim 3, wherein:
the plurality of the electronic devices within the interior space are stored on one side of the vertical wall; and
the plurality of cables for routing electrical power from the device receiving electrical power extend from the plurality of the electronic devices, through the vertical wall, and connect to the plurality of flexible receptacles on an opposite side of the vertical wall.

5. The cart of claim 3, comprising a plurality of shelves on the first vertical surface, wherein each of the plurality of shelves is located proximate a corresponding one of the plurality of flexible receptacles and configured for supporting and removably securing a power brick associated with one of the plurality of electronic devices.

6. The cart of claim 1, further comprising a removable cable management module comprising a plurality of cables for routing electrical power to the plurality of electronic devices.

7. A cart for electronic devices, comprising:
a cabinet defining an interior space for storing a plurality of electronic devices;
one or more doors to provide selective access to the interior space;
one or more wheels supporting the cabinet to increase a portability of the cart;
a power supply system having a plurality of cables for routing electrical power from an external source to each of the plurality of electronic devices; and
a bi-layer shelf comprising a lower layer configured for removably receiving and engaging a plurality of dividers, wherein each divider comprises
a generally horizontal portion configured for being removably received and engaged in the lower layer; and
a generally vertical portion extending from the generally horizontal portion and configured for separating the plurality of electronic devices from each other when placed between adjacent dividers, wherein a plurality of cables for routing electrical power are routed through a space between the generally horizontal portion of each of the plurality of dividers and the lower layer of the bi-level shelf to which the plurality of the dividers are removably engaged,
the generally horizontal portions of the plurality of dividers forming an upper layer of the bi-level shelf to which the plurality of dividers are removably engaged, and
the upper layer and the lower layer defining a space, the space configured to receive at least one cable.

8. The cart of claim 7, wherein the generally horizontal portion is configured for slidable engagement and disengagement with the lower layer.

9. A cart for electronic devices, comprising:
a cabinet defining an interior space for storing a plurality of electronic devices;
one or more doors to provide selective access to the interior space;
one or more wheels supporting the cabinet to increase a portability of the cart;
a power supply system having a plurality of cables for routing electrical power from an external source to each of the plurality of electronic devices; and
a positionable cable routing tray within the interior space, wherein the cable routing tray comprises
a first edge rotatably engaged with at least a portion of the cabinet; and
a second edge opposite the first edge, wherein the second edge is pivotable about the first edge about a generally horizontal axis from a generally horizontal position to a generally inclined position; and
at least a portion of the cable routing tray proximate the second edge is configured for removable engagement with at least a portion of the cabinet when the cable routing tray is in the generally horizontal position.

10. The cart of claim 9, wherein the plurality of cables are routed along an upper surface of the cable routing tray such that the cables are enclosed when the second edge is in the generally horizontal position.

11. The cart of claim 9, wherein the cable routing tray includes a plurality of channels and/or cleats for routing the cables along the routing tray.

12. A cart for electronic devices, comprising:
a cabinet defining an interior space for storing a plurality of electronic devices;
one or more doors to provide selective access to the interior space;
one or more wheels to increase a portability of the cart; and
a power supply system including a removable cable management module comprising:
a plurality of cables for routing electrical power to the plurality of electronic devices;
a plurality of connector slots configured for receiving and removably securing one or more of the plurality of cables;
a plurality of bosses configured for removably retaining at least a portion of the plurality of cables wrapped therearound; and
a plurality of hooks configured for removably retaining at least a portion of the plurality of cables extending therethrough.

13. The cart of claim 12, wherein:
the cable management module comprises electrical circuitry for charging the plurality of electronic devices; and
the plurality of cables for routing electrical power are connected to the electrical circuitry.

14. The cart of claim 12, wherein the cart is configured for slidably receiving and retaining the cable management module.

\* \* \* \* \*